US011880665B2

(12) United States Patent
Aher et al.

(10) Patent No.: US 11,880,665 B2
(45) Date of Patent: Jan. 23, 2024

(54) SYSTEMS AND METHODS FOR INSERTING DIALOGUE INTO A QUERY RESPONSE

(71) Applicant: Rovi Guides, Inc., San Jose, CA (US)

(72) Inventors: Ankur Anil Aher, Maharashtra (IN); Nishchit Mahajan, Punjab (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/573,988

(22) Filed: Jan. 12, 2022

(65) Prior Publication Data
US 2022/0138428 A1 May 5, 2022

Related U.S. Application Data

(63) Continuation of application No. 16/582,106, filed on Sep. 25, 2019, now Pat. No. 11,256,870.

(51) Int. Cl.
*G06F 40/30* (2020.01)
*G06F 16/33* (2019.01)
*G06F 16/332* (2019.01)
*G06F 40/253* (2020.01)
*G06F 40/295* (2020.01)

(52) U.S. Cl.
CPC .......... *G06F 40/30* (2020.01); *G06F 16/3329* (2019.01); *G06F 16/3344* (2019.01); *G06F 40/253* (2020.01); *G06F 40/295* (2020.01)

(58) Field of Classification Search
CPC ...... G06F 40/30; G06F 40/253; G06F 40/295; G06F 40/35; G06F 16/3329; G06F 16/3344
See application file for complete search history.

(56) References Cited

U.S. PATENT DOCUMENTS

| | | | |
|---|---|---|---|
| 6,795,808 B1 * | 9/2004 | Strubbe | G06F 16/90332 704/E15.04 |
| 8,768,934 B2 | 7/2014 | Jones et al. | |
| 9,342,507 B1 * | 5/2016 | Kaeser | G06F 40/40 |
| 9,390,087 B1 | 7/2016 | Roux et al. | |
| 9,953,078 B2 | 4/2018 | Kawamura | |
| 10,332,513 B1 * | 6/2019 | D'Souza | G10L 15/183 |
| 10,388,281 B2 | 8/2019 | Makino | |
| 10,417,037 B2 * | 9/2019 | Gruber | H04W 4/023 |
| 10,503,834 B2 | 12/2019 | Bachrach et al. | |
| 10,741,185 B2 * | 8/2020 | Gruber | G06F 16/2457 |
| 10,885,023 B1 | 1/2021 | Gupta et al. | |
| 10,909,986 B2 | 2/2021 | Trim et al. | |
| 10,922,494 B2 | 2/2021 | Lal et al. | |

(Continued)

*Primary Examiner* — Ibrahim Siddo
(74) *Attorney, Agent, or Firm* — HALEY GUILIANO LLP

(57) ABSTRACT

Systems and methods are described herein for inserting dialogue into query responses by generating and using dialogue metadata in conjunction with response templates. Metadata for each portion of dialogue of a plurality of portions of dialogue from a number of content items is stored, including information regarding the source content item, a transcript of the dialogue, and grammatical information. Upon receiving a query related to a content item, a type of response is first determined. Based on the type of response, and using the dialogue metadata, a portion of dialogue is identified for insertion into the response. The identified portion of dialogue is retrieved and inserted at an appropriate position within the response. The response is then generated for output.

20 Claims, 7 Drawing Sheets

100
When is the next episode of Game of Thrones?

102
Winter is coming, and the next episode of Game of Thrones is coming tomorrow at 8:00PM on HBO.

(56) References Cited

U.S. PATENT DOCUMENTS

| | | |
|---|---|---|
| 10,971,168 B2 | 4/2021 | Kwatra et al. |
| 10,984,781 B2 | 4/2021 | Griffiths et al. |
| 11,256,870 B2 | 2/2022 | Aher et al. |
| 11,500,911 B2* | 11/2022 | Nagaraja ................ G06F 3/0486 |
| 11,562,744 B1* | 1/2023 | Gao ........................ G10L 15/02 |
| 2004/0006476 A1 | 1/2004 | Chiu |
| 2004/0072136 A1* | 4/2004 | Roschelle ................ G09B 7/00 |
| | | 434/350 |
| 2004/0158486 A1 | 8/2004 | Nudd et al. |
| 2005/0034057 A1 | 2/2005 | Hull et al. |
| 2010/0114944 A1* | 5/2010 | Adler .................... G10L 13/027 |
| | | 707/E17.062 |
| 2015/0178371 A1 | 6/2015 | Seth et al. |
| 2016/0012105 A1* | 1/2016 | Chang ................... G06F 16/248 |
| | | 707/706 |
| 2016/0225372 A1 | 8/2016 | Cheung et al. |
| 2017/0069316 A1 | 3/2017 | Makino |
| 2018/0089572 A1* | 3/2018 | Aili ........................ G06F 9/453 |
| 2018/0285429 A1 | 10/2018 | Lei et al. |
| 2019/0156198 A1* | 5/2019 | Mars ...................... G06N 20/20 |
| 2019/0236155 A1* | 8/2019 | Bachrach ............... G06F 16/243 |
| 2019/0251165 A1* | 8/2019 | Bachrach ............... G06N 3/084 |
| 2019/0286711 A1* | 9/2019 | Terry ..................... G06N 20/00 |
| 2019/0340201 A1* | 11/2019 | Havens .................. G06N 20/00 |
| 2019/0392826 A1* | 12/2019 | Lee ........................ G06V 20/59 |
| 2019/0392827 A1* | 12/2019 | Park ...................... G10L 15/1815 |
| 2020/0034797 A1* | 1/2020 | Jonnalagadda ......... H04L 51/02 |
| 2020/0387550 A1 | 12/2020 | Cappetta et al. |
| 2021/0089625 A1 | 3/2021 | Aher et al. |
| 2021/0294724 A1* | 9/2021 | Muppalla .............. G06F 11/366 |
| 2021/0350073 A1* | 11/2021 | Trehan ................ G06F 16/3344 |
| 2022/0180867 A1* | 6/2022 | Bobbili ................... G10L 15/30 |
| 2022/0300718 A1* | 9/2022 | Chen ..................... G06F 40/216 |

\* cited by examiner

SYSTEMS AND METHODS FOR INSERTING DIALOGUE INTO A QUERY RESPONSE

CROSS-REFERENCE TO RELATED APPLICATION

This application is a continuation of U.S. patent application Ser. No. 16/582,106, filed Sep. 25, 2019, the disclosure of which is incorporated by reference in its entirety.

BACKGROUND

The present disclosure relates to content delivery and consumption systems and, more particularly, generating responses to search queries related to content items.

SUMMARY

Many times, in response to a search query and in addition to search results, a conversational system replies with text on a display and/or a voice reply to the search query. Such responses are often limited to acknowledgements (e.g., "okay"), simple generic answers, or a text-to-speech conversion of one or more search results. These existing solutions, however, do not provide engaging responses to the user.

Systems and methods are described herein for inserting dialogue into query responses in order to make the response more relevant and engaging to the user by generating and using dialogue metadata in conjunction with response templates. Metadata for each portion of dialogue of a plurality of portions of dialogue from a number of content items is stored. The metadata may include information regarding the content item from which the dialogue comes, a transcript of the dialogue, and grammatical information relevant to insertion of the dialogue into a query response. Upon receiving a query related to a content item, a type of response is first determined. Different types of queries may have different types of responses. Based on the type of response, and using the dialogue metadata, a portion of dialogue is identified for insertion into the response. The identified portion of dialogue is retrieved and inserted at an appropriate position within the response, which depends on the type of response. The response is then generated for output.

In some embodiments, a particular portion of dialogue may be identified for insertion into the response based on its part of speech. A part of speech that can be inserted into the response is identified. Natural langue processing is used to determine whether a particular portion of dialogue is of the identified part of speech. If so, that portion of dialogue is selected for insertion. If not, and if no other portions of dialogue are of the identified part of speech, a portion of dialogue can be modified to become the identified part of speech to enable its insertion into the response. Alternatively or additionally, metadata is retrieved for a subset of portions of dialogue that come from the content item. The metadata for each portion of dialogue in the subset is compared with the type of response to identify a portion of dialogue that can be inserted into the response.

In some embodiments, each portion of dialogue may be categorized as a particular type of phrase, such as a greeting or exclamation, dialogue related to a specific character in the content item, and/or dialogue related to the content item itself. For example, the phrase "hakuna matata" may be categorized as a greeting, and as dialogue related to the movie "The Lion King," and the phrase "I'm the king of the world" may be categorized as related to the character Jack Dawson in the movie "Titanic." In selecting a portion of dialogue to insert into the response, the category of the portion of dialogue may be compared with the response template.

In some embodiments, if the query is related to a specific entity, such as a character or actor, the entity is identified from the query, and it is determined whether the identified portion of dialogue can be inserted into the response template. Natural language processing is used to determine whether the dialogue makes grammatical sense when inserted into the response. If not, proper nouns in the portion of dialogue may be replaced with appropriate pronouns. For example, in response to the query "Who plays Jack in the movie 'Titanic'?" the portion of dialogue "I'm the king of the world" may be selected, but not make grammatical sense within the response. The pronoun part "I'm" of the portion of dialogue may therefore be replaced by "he's" or "he is." The response to the query may then be, for example, "Jack was played by Leonardo DiCaprio, and he is the king of the world."

In some cases, the portion of dialogue selected for insertion into the response contains at least some of the same words in the same order compared to the response. In these cases, at least part of the response may be replaced by the selected portion of dialogue.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
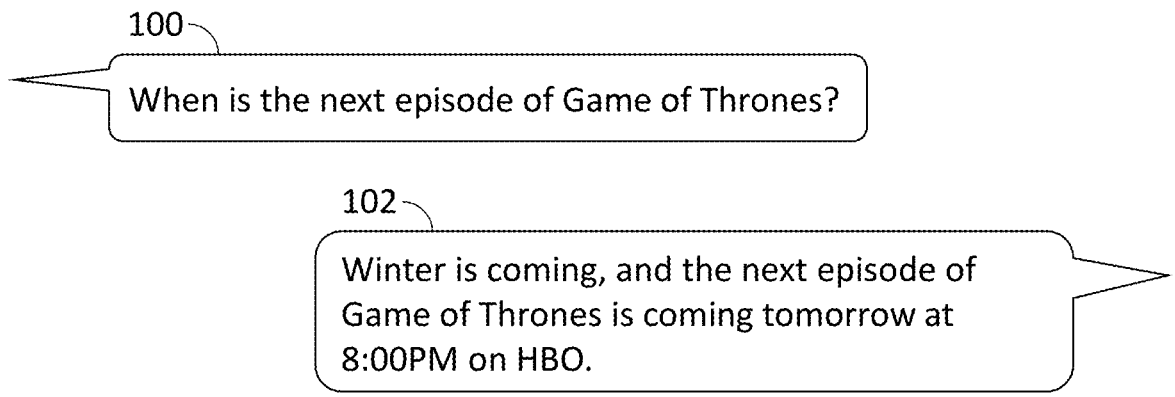
FIG. 1 shows an exemplary query and response, in accordance with some embodiments of the disclosure.
Figure 2:
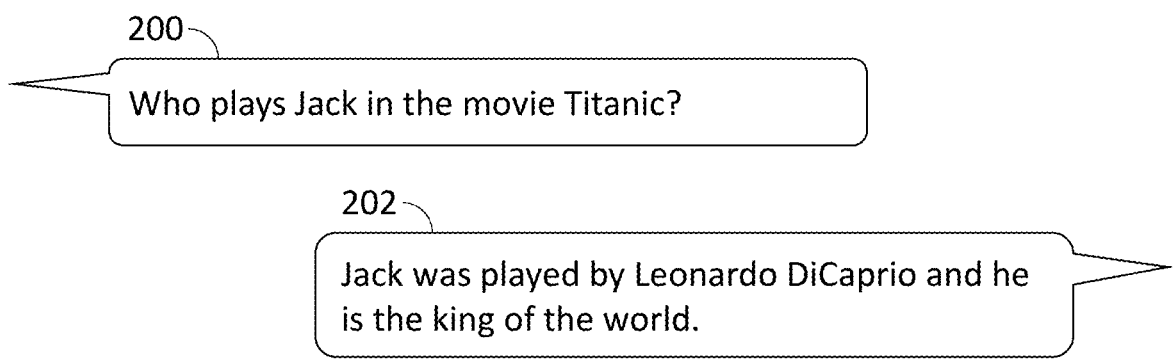
FIG. 2 shows a second exemplary query and response, in accordance with some embodiments of the disclosure.
Figure 3:
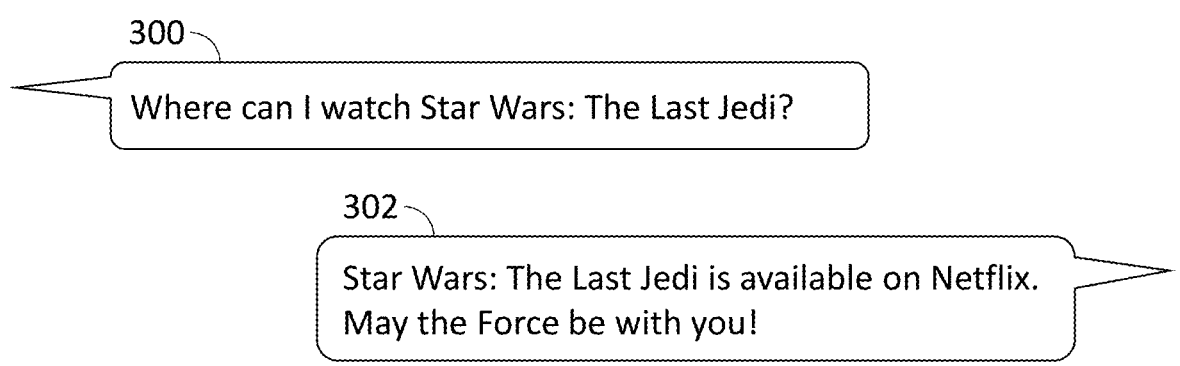
FIG. 3 shows a third exemplary query and response, in accordance with some embodiments of the disclosure.

FIGS. 1-3 show exemplary search queries and responses, in accordance with some embodiments of the disclosure. A user may enter or speak a query 100, 200, or 300 related to a content item or entity within a content item. The system generates a reply 102, 202, 302 that is appropriate to the type of query and incorporates dialogue from the content item to which the query relates, or dialogue referring to or spoken by the entity to which the query relates. The system determines where in the response to insert the dialogue using natural language processing. The system also determines whether the dialogue needs to be modified before being inserted into the response. For example, in response to query 200 asking "Who plays Jack in the movie 'Titanic'?" the system may select the dialogue "I'm the king of the world!" However, that dialogue does not fit grammatically in the response. The system therefore modifies the dialogue to "he is the king of the world," thus describing the character Jack in the third person rather than maintaining the original wording, which was spoken by the character Jack describing himself in the first person. The system may add conjunctions or other grammatical structures in order to facilitate insertion of the dialogue into the response.

Figure 4:
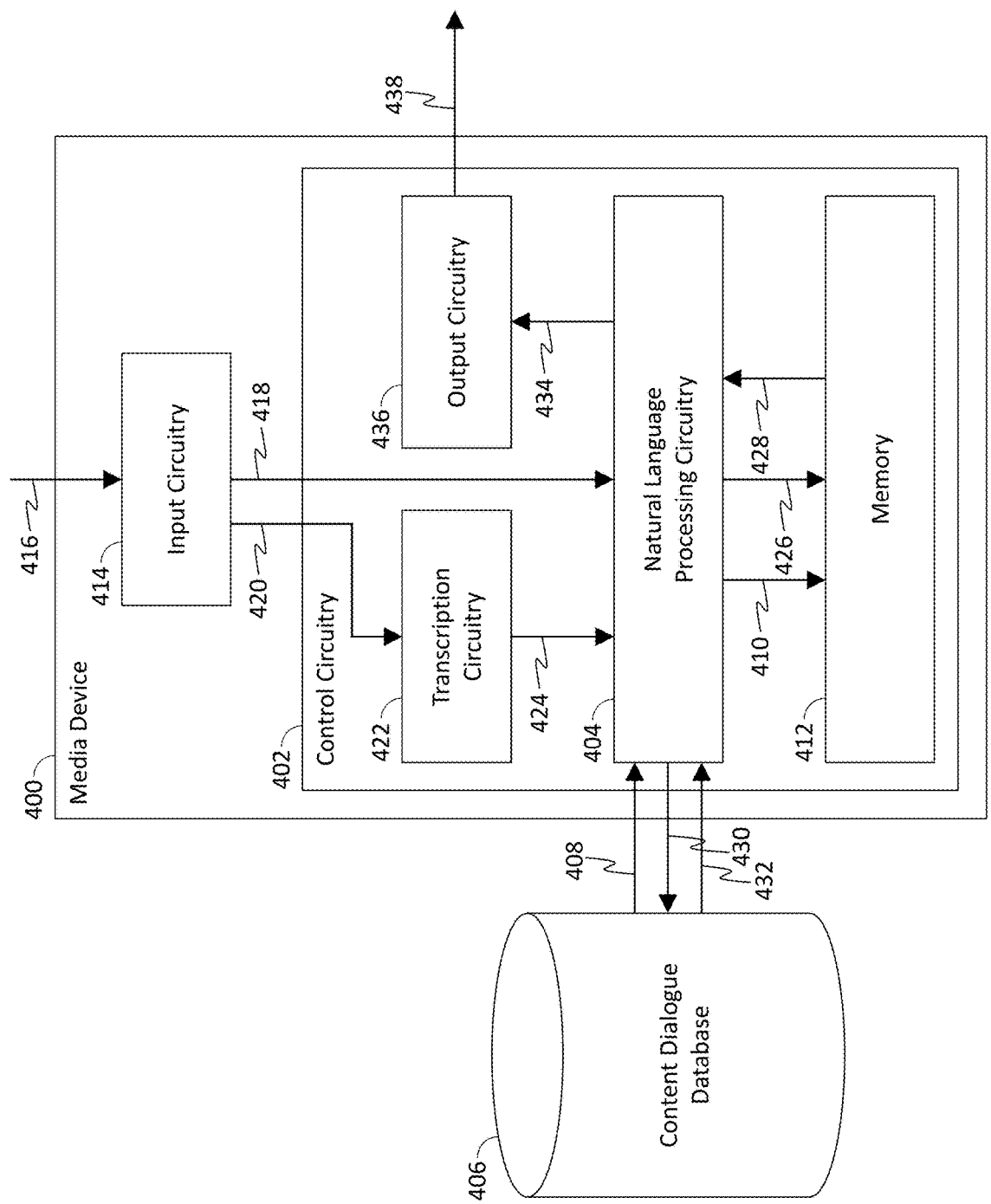
FIG. 4 is a block diagram showing components and data flow therebetween of an exemplary system for inserting dialogue into a query response, in accordance with some embodiments of the disclosure.

FIG. 4 is a block diagram showing components and data flow therebetween of an exemplary system for selectively playing back portions of audio of a content item, in accordance with some embodiments of the disclosure. Media device 400 includes control circuitry 402, which may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 402, using natural language processing circuitry 404, processes portions of dialogue from various content items. Control circuitry 402 may access each content item directly or may access content dialogue database 406. Natural language processing circuitry 404 receives 408 portions of dialogue from content dialogue database 406 and identifies words and grammatical structures in each portion of dialogue. Natural language processing circuitry 404 generates metadata describing each portion of dialogue and transmits 410 the metadata to memory 412 for storage.

Media device 400 also includes input circuitry 414, which may include a microphone and voice processing circuitry for receiving voice commands, infrared receiving circuitry for receiving commands from a remote control device, a touchscreen interface for receiving user interactions with graphical user interface elements, or any combination thereof or any other suitable input circuitry for receiving any other suitable user input. Media device 400, using input circuitry 414, receives 416 a search query from the user. If the search query is entered by the user as a text string, input circuitry 414 transfers 418 the text of the search query to natural language processing circuitry 404. If the search query is entered vocally (i.e., spoken by the user), input circuitry 414 transfers 420 audio data representing the query to transcription circuitry 422, which uses speech recognition to transcribe the search query into a corresponding text string. The transcription is then transferred 424 to natural language processing circuitry 404.

Natural language processing circuitry 404 identifies a content item related to the query. For example, in processing query 100, natural language processing circuitry 404 identifies "Game of Thrones" as the content item to which the query relates. When processing query 200, natural language processing circuitry 404 identifies "Titanic" as the content item to which the query relates, and further identifies "Jack" as a character in "Titanic" about whom information has been requested. Query 300 contains "Star Wars: The Last Jedi" as the title of a content item, which natural language processing circuitry can identify. Natural language processing circuitry 404 may also determine that the presence of a colon in the title of the content item indicates a subtitle and separately identify "Star Wars" as a group of content items of which "The Last Jedi" is a member. When retrieving portions of dialogue for insertion, control circuitry 402 may retrieve portions of dialogue related to "Star Wars" generally or to "The Last Jedi" specifically.

Natural language processing circuitry 404 also processes the query to determine what information is being requested. Natural language processing circuitry 404 selects a response template based on the type of information being requested. For example, in response to query 100, which asks for information regarding broadcast time of an episode of a particular series, natural language processing circuitry 404 may select a response template having the format "The next episode of {X} is {DATE} on {SOURCE}" where {X} represents the name of the series, {DATE} represents the date and time at which the requested episode will be broadcast, and {SOURCE} represents the channel or content source on which the requested episode will be broadcast.

Natural language processing circuitry 404 transmits 426 a query to, for example, memory 412 for the requested information. The requested information may alternatively be requested from a remote server or database stored outside media device 400. Natural language processing circuitry 404 receives 428 the requested information and incorporates it into the response according to the selected response template. Natural language processing circuitry 404 also transmits 430 a second query to content dialogue database 406 for portions of content associated with the content item to which the query relates. In response to the second query, natural language processing circuitry 404 receives 432 a plurality of portions of content associated with the content item. Natural language processing circuitry 404 may analyze each portion of dialogue to determine which portion to insert into the response. Alternatively, natural language processing circuitry 404 may use metadata previously generated by natural language processing circuitry 404 to determine which portion to insert into the response.

After selecting a portion of dialogue to insert into the response, natural language processing circuitry 404 determines, based on grammatical structures of the response and the dialogue, where in the response to insert a portion of dialogue. Natural language processing circuitry 404 then constructs the response according to the response template, incorporating both the requested information received from memory 412 and the selected portion of dialogue. Natural language processing circuitry 404 may transmit 434 text of the response, a text-to-speech audio conversion of the text of the response, or both to output circuitry 436. Output circuitry 436 may include video and audio processing circuitry enabling media device 400 to output text of the response on a display and audio of the response through an audio output device such as a speaker or headphones.

Figure 5:
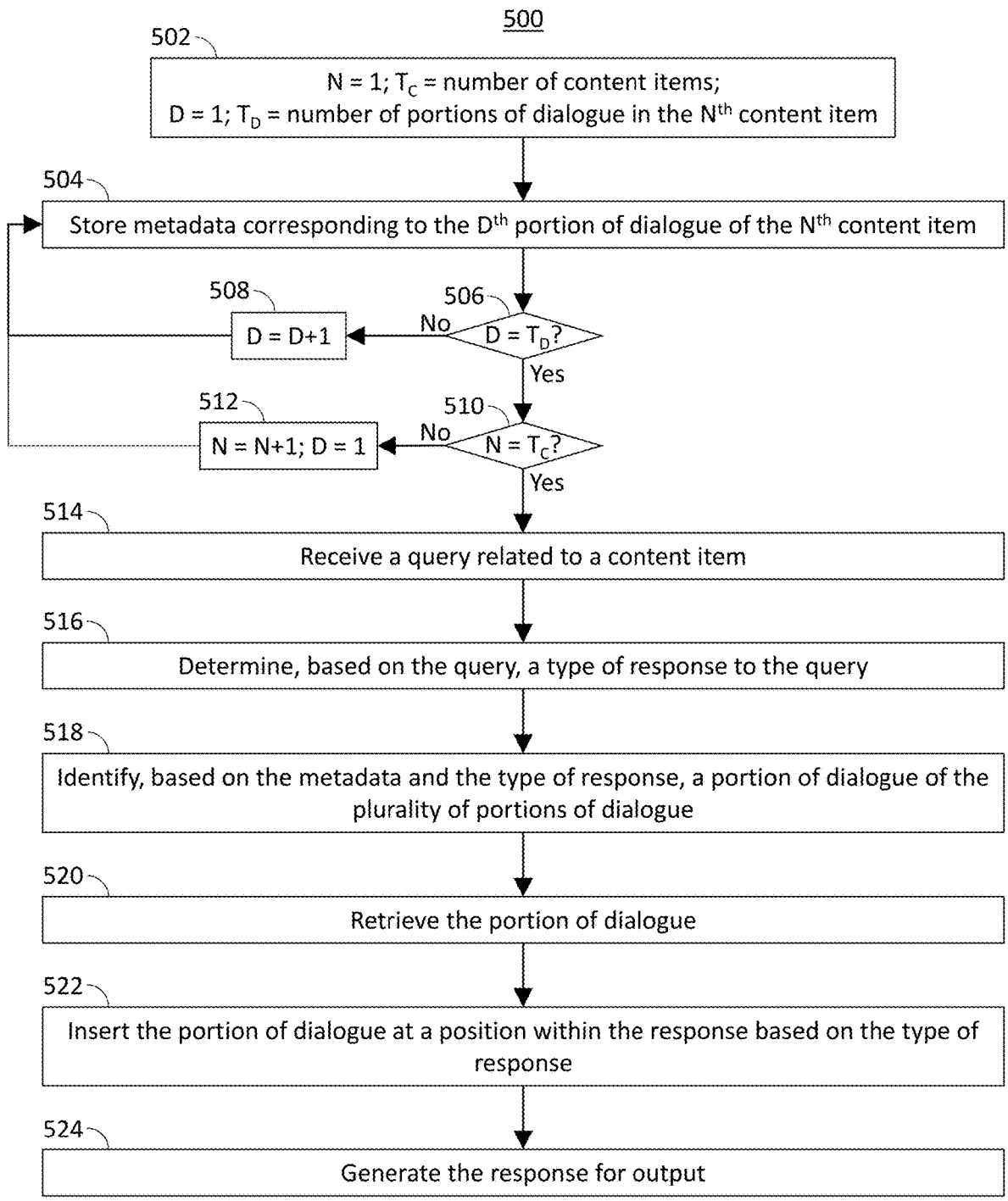
FIG. 5 is a flowchart representing a process for inserting dialogue into a query response, in accordance with some embodiments of the disclosure.

FIG. 5 is a flowchart representing an illustrative process 500 for inserting dialogue into a query response, in accordance with some embodiments of the disclosure. Process 500 may be implemented on control circuitry 402. In addition, one or more actions of process 500 may be incorporated into or combined with one or more actions of any other process or embodiment described herein.

At 502, control circuitry 402 initializes a counter variable N, setting its value to one, a variable $T_C$ representing the number of content items for which dialogue is available to process, a counter variable D, setting its value to one, and a variable $T_D$ representing the number of portions of dialogue available to process from a particular content item.

At 504, control circuitry 402 stores metadata corresponding to the $D^{th}$ portion of dialogue on the $N^{th}$ content item. The metadata may be generated by natural language processing circuitry 402 through processing of the $D^{th}$ portion of dialogue. The metadata may describe grammatical structures or parts of speech and may include a transcription of the dialogue and an identifier of the content item from which the dialogue comes. At 506, control circuitry 402 determines whether D is equal to $T_D$, meaning that all portions of dialogue from the $N^{th}$ content item have been processed. If D is not equal to $T_D$, then, at 508, control circuitry 402 increments the value of D by one and processing returns to step 504. If D is equal to $T_D$, then, at 510, control circuitry 402 determines whether N is equal to $T_C$, meaning that all content items have been processed. If N is not equal to $T_C$, then, at 512, control circuitry 402 increments the value of N by one and resets the value of D to one. Processing then returns to step 504.

Steps 502 through 512 generate and store metadata corresponding to words and grammatical structure contained in each portion of dialogue from each available content item. These steps may alternatively be performed by a remote device, such as a computer or other processing device on which content dialogue database 406 may be hosted.

At 514, control circuitry 402 receives a query (e.g., query 100, 200, 300) related to a content item. The query may be received as a text input or as a voice input. If the query is received as a voice input, the voice input is transcribed to text for further processing.

At 516, control circuitry 402 determines, based on the query, a type of response. For example, for a query requesting information about broadcast times for a particular content item, control circuitry 402 may select an appropriate response template such as described above in connection with FIG. 4.

At 518, control circuitry 402 identifies, based on the metadata and the type of response, a portion of dialogue. The selected response template may grammatically accept a greeting or exclamation prepended or appended to it. Using metadata of the portions of dialogue related to the content item to which the query relates, control circuitry 402 identifies an appropriate greeting or exclamation to prepend or append to the response. Control circuitry 402 may decide, based on usage of the greeting or exclamation within the content item, whether to prepend or append the dialogue to the response. For example, if the query relates to "Star Wars: The Last Jedi," control circuitry 402 may select the portion of dialogue "May the Force be with you!" to be inserted into the response. Since that phrase is most often used in "Star Wars" at the end of a sentence or conversation, control circuitry 402 determines that it should be appended to the end of the response.

At 520, control circuitry 402 retrieves the portion of dialogue. Control circuitry 402 may retrieve the audio of the portion of dialogue for playback as part of an audio response or may retrieve transcribed text of the portion of dialogue from, for example, the metadata. At 522, control circuitry 402 inserts the portion of dialogue at a position within the response based on the type of response as described above and, at 524, generates the response for output. Control circuitry 402 may generate text for output on a display or audio for output by an audio output device.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
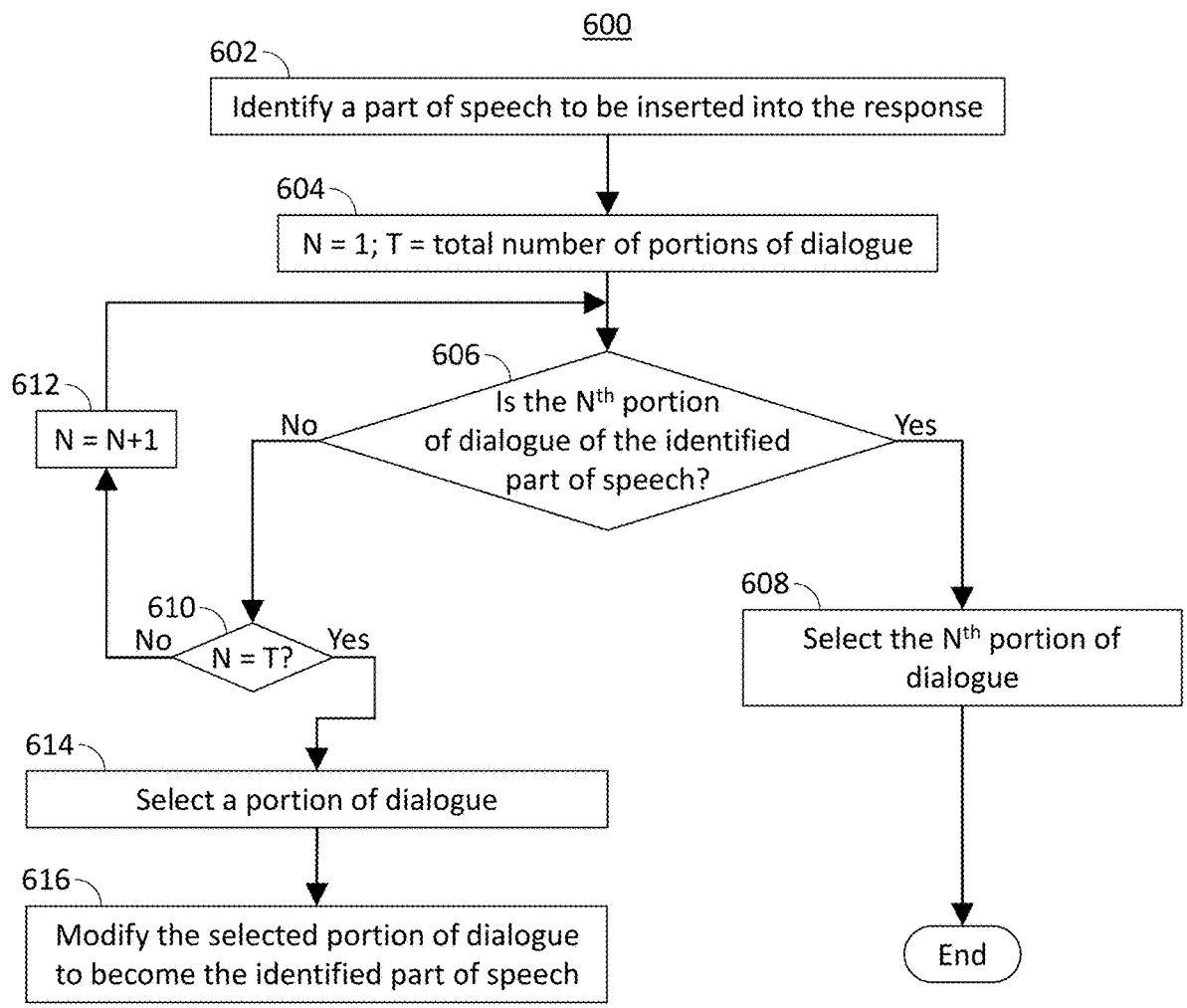
FIG. 6 is a flowchart representing a first process for identifying a portion of dialogue, in accordance with some embodiments of the disclosure.

FIG. 6 is a flowchart representing a first illustrative process 600 for identifying a portion of dialogue, in accordance with some embodiments of the disclosure. Process 600 may be implemented on control circuitry 402. In addition, one or more actions of process 600 may be incorporated into or combined with one or more actions of any other process or embodiment described herein.

At 602, control circuitry 402, using natural language processing circuitry 404, identifies a part of speech to be inserted into the response. For example, natural language processing circuitry 404 may analyze the wording and grammar of the response template to identify positions at which dialogue can be inserted and, grammatically, what kinds of words or phrases can be inserted at that position.

At 604, control circuitry 402 initializes a counter variable N, setting its value to one, and a variable T representing the total number of portions of dialogue being considered for insertion into the response. At 606, control circuitry 402, using natural language processing circuitry 404, determines whether the $N^{th}$ portion of dialogue is of the identified part of speech. For example, natural language processing circuitry 404 may access a dictionary stored locally in memory 412 or on a remote server. Alternatively, natural language processing 404 may determine the part of speech of the dialogue from grammatical context, capitalizations or other indications within the dialogue. If the $N^{th}$ portion of dialogue is of the identified part of speech, then, at 608, control circuitry 402 selects the $N^{th}$ portion of dialogue to be inserted into the response. If the $N^{th}$ portion of dialogue is not of the identified part of speech, then at 610, control circuitry 402 determines whether N is equal to T. If N is not equal to T, meaning that there are additional portions of dialogue to consider, then, at 612, control circuitry 402 increments the value of N by one, and processing returns to step 606. If N is equal to T, meaning that all portions of dialogue have been considered, then, at 614, control circuitry 402 selects a portion of dialogue and, at 616, modifies the selected portion of dialogue to become the identified part of speech, thereby enabling its insertion into the response.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
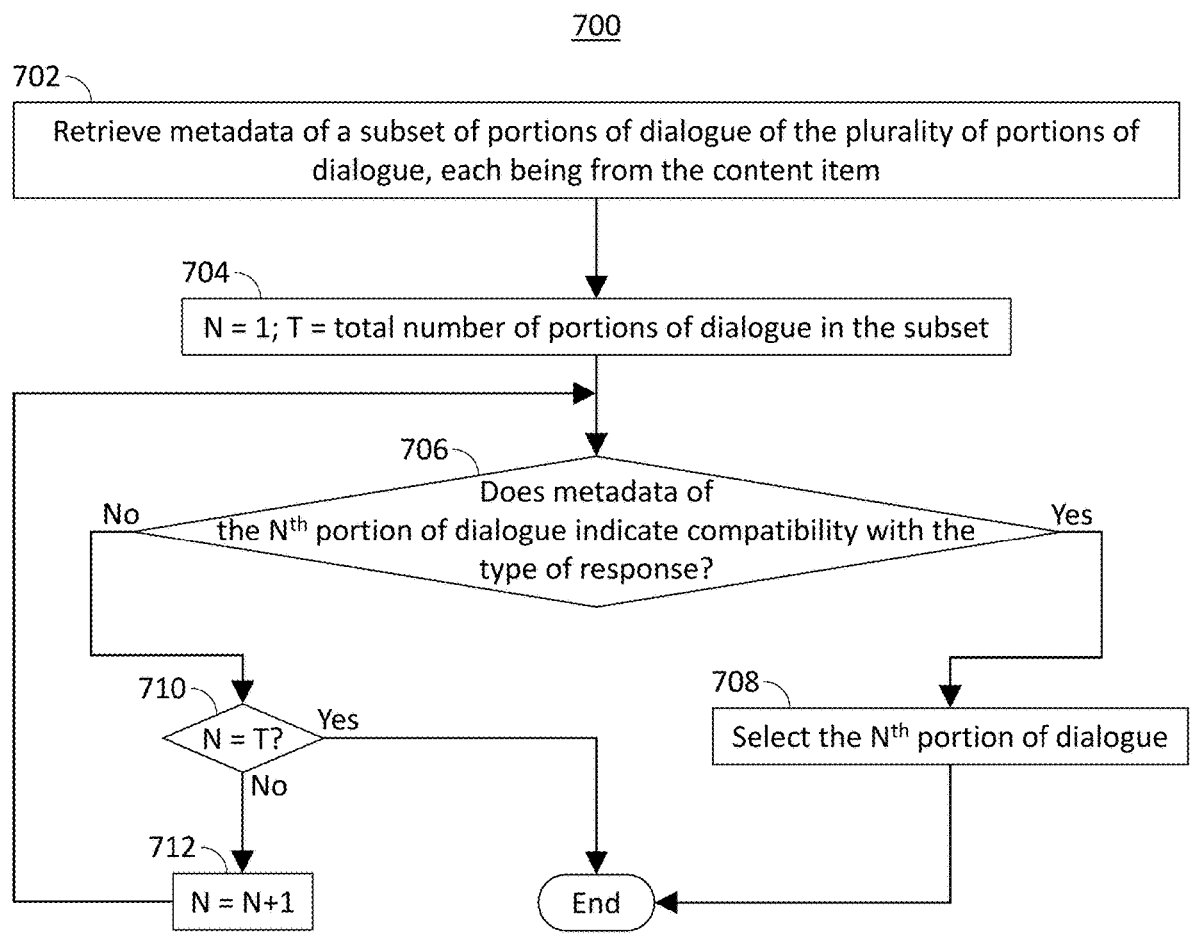
FIG. 7 is a flowchart representing a second process for identifying a portion of dialogue, in accordance with some embodiments of the disclosure.

FIG. 7 is a flowchart representing a second illustrative process 700 for identifying a portion of dialogue, in accordance with some embodiments of the disclosure. Process 700 may be implemented on control circuitry 402. In addition, one or more actions of process 700 may be incorporated into or combined with one or more actions of any other process or embodiment described herein.

At 702, control circuitry 402 retrieves metadata of a subset of portions of dialogue that come from the content item to which the query relates. For example, the metadata may be stored in memory 412 or in content dialogue database 406. Control circuitry 402 may retrieve the metadata by transmitting an SQL SELECT command to the database or by searching the metadata for an identifier of the content item.

At 704, control circuitry 402 initializes a counter variable N, setting its value to one, and a variable T representing the total number of portions of dialogue in the subset. At 706, control circuitry 402 determines whether metadata of the $N^{th}$ portion of dialogue indicates compatibility with the type of response. For example, metadata of each content item may include information describing grammatical features of the dialogue which can be used by natural language processing circuitry 404 to determine whether the dialogue can be inserted into a particular response. If the metadata does indicate compatibility with the type of response, then, at 708, control circuitry 402 selects the $N^{th}$ portion of dialogue. If the metadata does not indicate compatibility, then, at 710, control circuitry 402 determines whether N is equal to T, meaning that all portions of dialogue in the subset have been considered. If N is not equal to T, then, at 712, control circuitry 402 increments that value of N by one, and processing returns to step 706. If N is equal to T, then the process is complete, and no further steps are taken in the process. It may thus be the case that no portion of dialogue is suitable for insertion into the response, or that no portion of dialogue can be inserted into the response without modification.

The actions or descriptions of FIG. 7 may be used with any other embodiment of this disclosure. In addition, the actions and descriptions described in relation to FIG. 7 may be done in any suitable alternative orders or in parallel to further the purposes of this disclosure.

Figure 8:
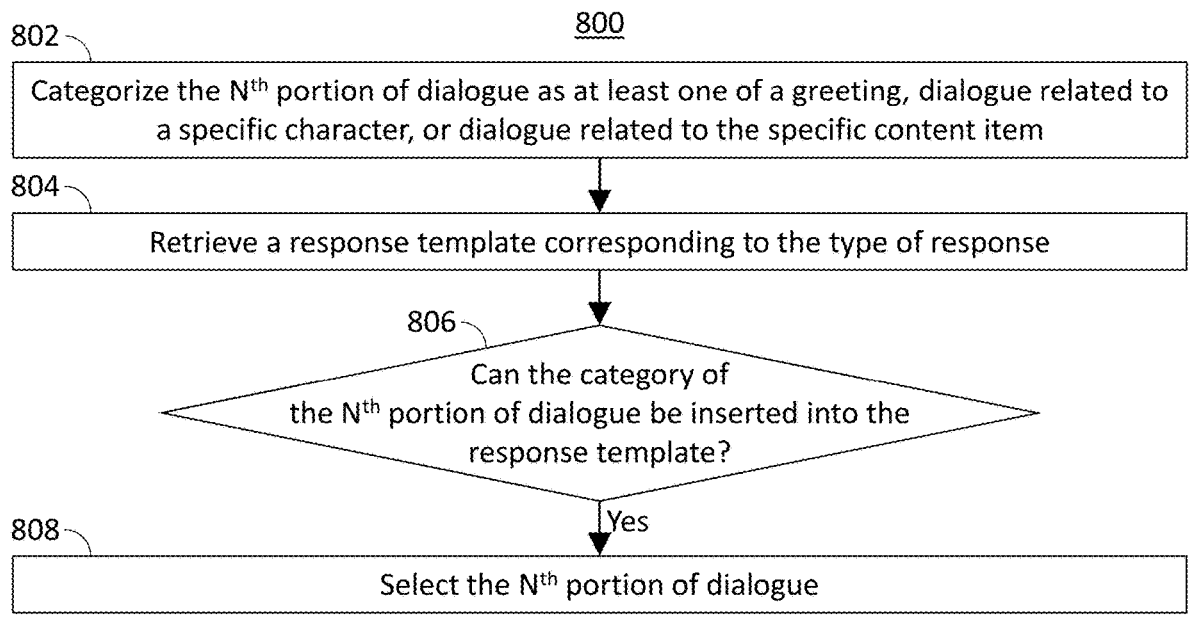
FIG. 8 is a flowchart representing a first process for selecting a portion of dialogue based on the category of the portion of dialogue, in accordance with some embodiments of the disclosure.
Figure 9:
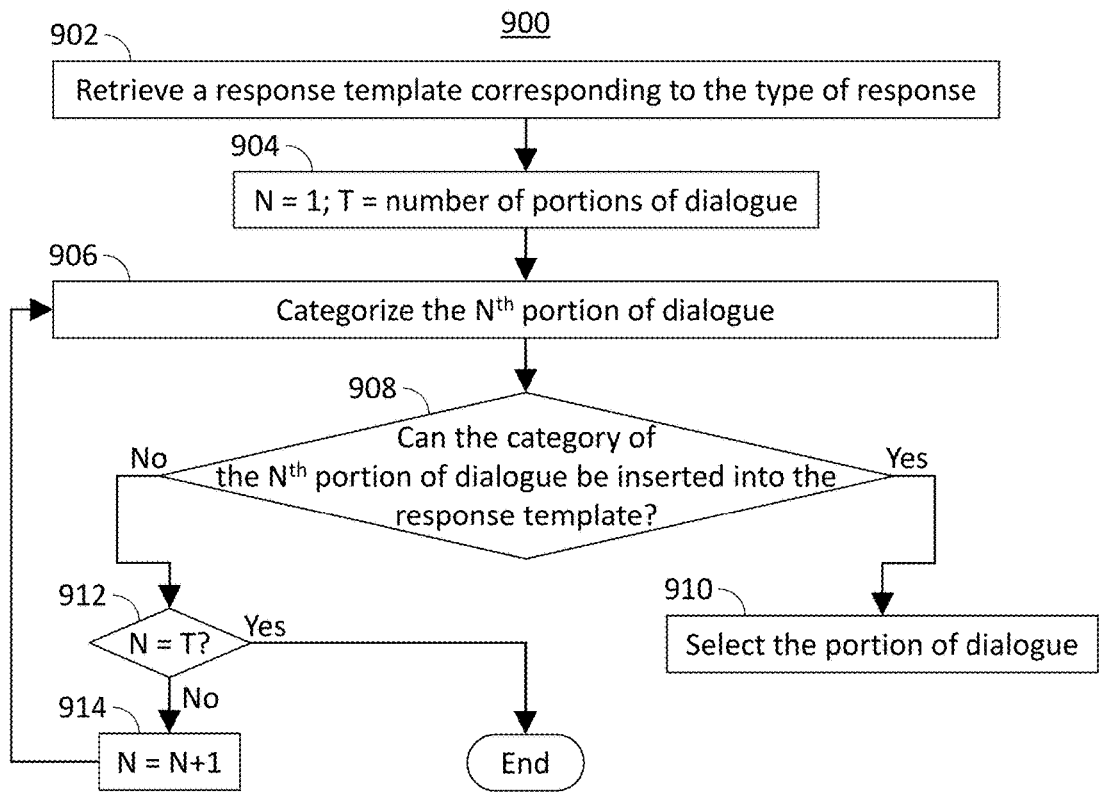
FIG. 9 is a flowchart representing a second process for selecting a portion of dialogue based on the category of the portion of dialogue, in accordance with some embodiments of the disclosure.

FIGS. 8 and 9 are flowcharts representing illustrative processes 800 and 900 for selecting a portion of dialogue based on the category of the portion of dialogue, in accordance with some embodiments of the disclosure. Processes 800 and 900 may be implemented on control circuitry 402. In addition, one or more actions of either process 800 or process 900 may be incorporated into or combined with one or more actions of any other process or embodiment described herein.

Referring now to FIG. 8, a first process for selecting a portion of dialogue based on the category of the portion of dialogue will now be described. At 802, control circuitry 402, using natural language processing circuitry 404, categorizes a portion of dialogue as at least one of a greeting, dialogue related to a specific character, or dialogue related to the specific content item. Natural language processing circuitry 404 may analyze any or all of the words, punctuation, and usage of the dialogue within the content item to determine whether the dialogue is a greeting. Natural language processing circuitry 404 may analyze nouns and pronouns in conjunction with the identity of the speaker of the dialogue to determine if the dialogue relates to a specific character. Natural language processing circuitry 404 may analyze usage and frequency of usage of the dialogue within the content item or frequency of usage in other content items to determine whether the dialogue relates specifically to the content item. For example, "May the Force be with you" is used almost exclusively in movies and television shows belonging to the "Star Wars" franchise, and most uses of the phrase outside of the "Star Wars" franchise are used in reference to or in parody of the "Star Wars" franchise. Thus, natural language processing circuitry 404 may determine that "May the Force be with you" is dialogue that is related specifically to "Star Wars." As another example, "I'm the king of the world!" is used only once in the movie "Titanic" and is spoken by the character Jack Dawson. Use of the first-person pronoun "I" indicates that the dialogue relates specifically to Jack Dawson.

At 804, control circuitry 402 retrieves a response template corresponding to the type of response. For example, in response to a query requesting information on where to watch a particular content item, control circuitry 402 may retrieve a response template similar to "{X} is available on {SOURCE}" where {X} represents the requested content item and {SOURCE} represents the channel or service on which the requested content item is available. At 806, control circuitry 402 determines whether the category of the portion of dialogue can be inserted into the response template. Natural language processing circuitry 404 compares the identified category of the portions of dialogue with the grammatical structure of the response template as well as the type of information requested. For example, in response to a request for information regarding broadcast times for a particular content item, a portion of dialogue categorized as relating to a specific character may not be an appropriate selection for insertion into the response template. However, a portion of dialogue categorized as relating to the specific content item about which information has been requested may be inserted into the response. Greetings and valedictions may also be inserted at the start or end of the response template, respectively. If the category of the portion of dialogue can be inserted into the response template, then, at 808, control circuitry 402 selects the portion of dialogue for insertion.

Referring now to FIG. 9, an alternative process for selecting a portion of dialogue based on the category of the portion of dialogue will now be described. At 902, control circuitry 402 first retrieves a response template corresponding to the type of response. At 904, control circuitry 402 initializes counter variable N, setting its value to one, and variable T representing the number of portions of dialogue. At 906, control circuitry 402, using natural language processing circuitry 404, categorizes the $N^{th}$ portion of dialogue using methods described above in connection with FIG. 8. At 908, control circuitry 402 determines whether the category of the $N^{th}$ portion of dialogue can be inserted into the response template using methods described above in connection with FIG. 8. If so, then, at 910, control circuitry 402 selects the $N^{th}$ portion of dialogue for insertion into the response. If not, then, at 912, control circuitry 402 determines whether N is equal to T, meaning that all portions of dialogue have been processed. If N is not equal to T, then, at 914, control circuitry 402 increments the value of N by one, and processing returns to step 906.

The actions or descriptions of FIGS. 8 and 9 may be used with any other embodiment of this disclosure. In addition, the actions and descriptions described in relation to FIGS. 8 and 9 may be done in any suitable alternative orders or in parallel to further the purposes of this disclosure.

If no portion of dialogue is selected, control circuitry 402 may modify a portion of dialogue to be suitable for insertion into the response template. For example, control circuitry 402, using natural language processing circuitry 404, may analyze words and grammatical structures of both the response template and a portion of dialogue to determine how best to modify the portion of dialogue to be compatible with the response template. For example, in response to a query for information regarding the actor who played a particular character in a particular content item, the selected response template may be "{ACTOR} played {CHARACTER} in {CONTENT_ITEM}." Control circuitry 402 may determine that a portion of dialogue related to the character may be inserted at the end of the template. As an example, the query may ask what actor played Jack in the movie "Titanic." In response, control circuitry 402 may not identify any grammatically compatible portions of dialogue about the character Jack. However, the dialogue "I'm the king of the world!" spoken by Jack in describing himself, may be suitable if modified, and control circuitry 402, using natural language processing circuitry 404, determines that the descriptive first-person pronoun "I'm" can be modified to the third-person equivalent "he is," thus making the dialogue grammatically compatible with the response template. As another example, the query may be for information regarding the movie "Soylent Green." The dialogue "Soylent Green is people!" may be made grammatically compatible by replacing the proper noun "Soylent Green" with the third-person pronoun "it."

Figure 10:
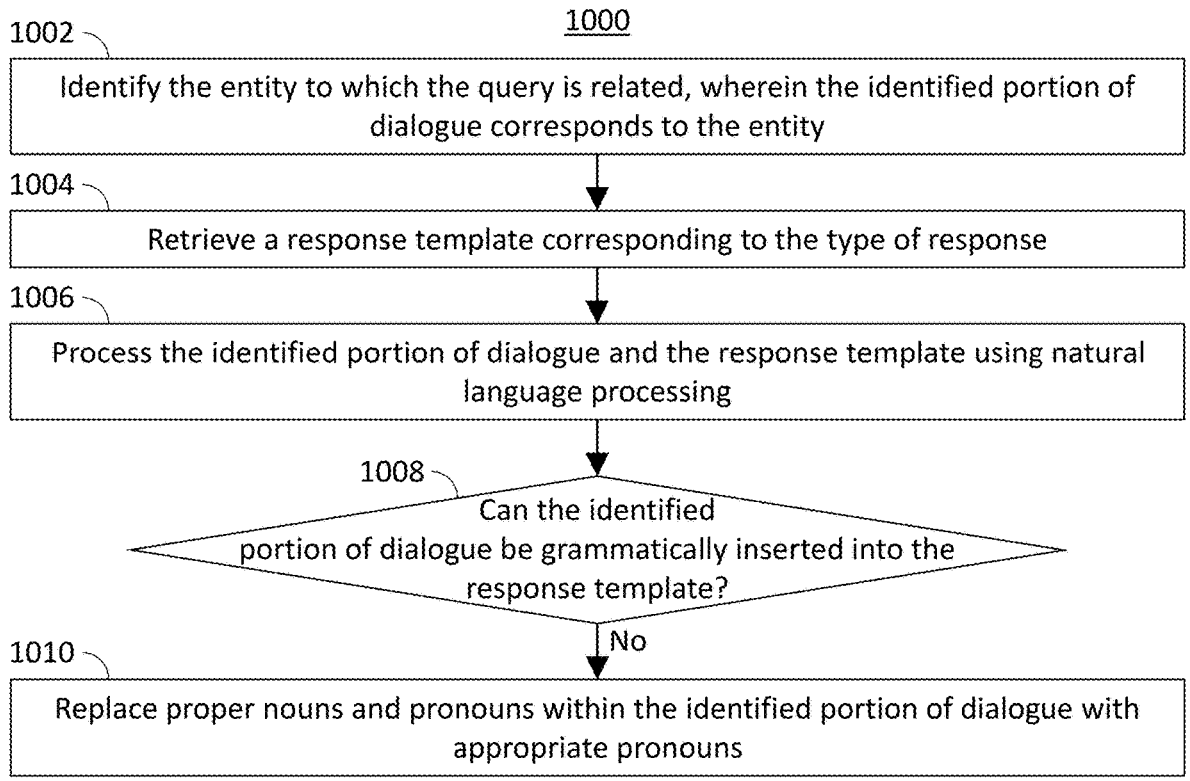
FIG. 10 is a flowchart representing a process for modifying a portion of dialogue for insertion into a query response.

FIG. 10 is a flowchart representing an illustrative process 1000 for modifying a portion of dialogue for insertion into a query response. Process 1000 may be implemented on control circuitry 402. In addition, one or more actions of process 1000 may be incorporated into or combined with one or more action of any other process or embodiment described herein.

At 1002, control circuitry 402, using natural language processing circuitry 404, identifies the entity to which the query is related. For example, natural language processing circuitry 404 may identify proper nouns in the dialogue based on capitalization. Alternatively, metadata associated with the dialogue may include an identifier of the entity that spoke the dialogue or about whom the dialogue was spoken. At 1004, control circuitry 402 retrieves a response template corresponding to the type of response. This may be accomplished using methods described above in connection with FIG. 8. At 1006, control circuitry 402, using natural language processing circuitry 404, processes the identified portion of dialogue and the response template to identify various words and grammatical features of both the dialogue and the response template. At 1008, control circuitry 402 determines, using the identified words and grammatical features, whether the identified portion of dialogue can be inserted into the response template. This may be accomplished using methods described above in connection with FIG. 8. If the identified portion of dialogue cannot be inserted into the response template, then, at 1010, control circuitry 402, using natural language processing circuitry 404, replaces proper nouns and pronouns within the identified portion of dialogue with appropriate pronouns allowing the portion of dialogue to be inserted into the response template.

The actions or descriptions of FIG. 10 may be used with any other embodiment of this disclosure. In addition, the actions and descriptions described in relation to FIG. 10 may be done in any suitable alternative orders or in parallel to further the purposes of this disclosure.

Figure 11:
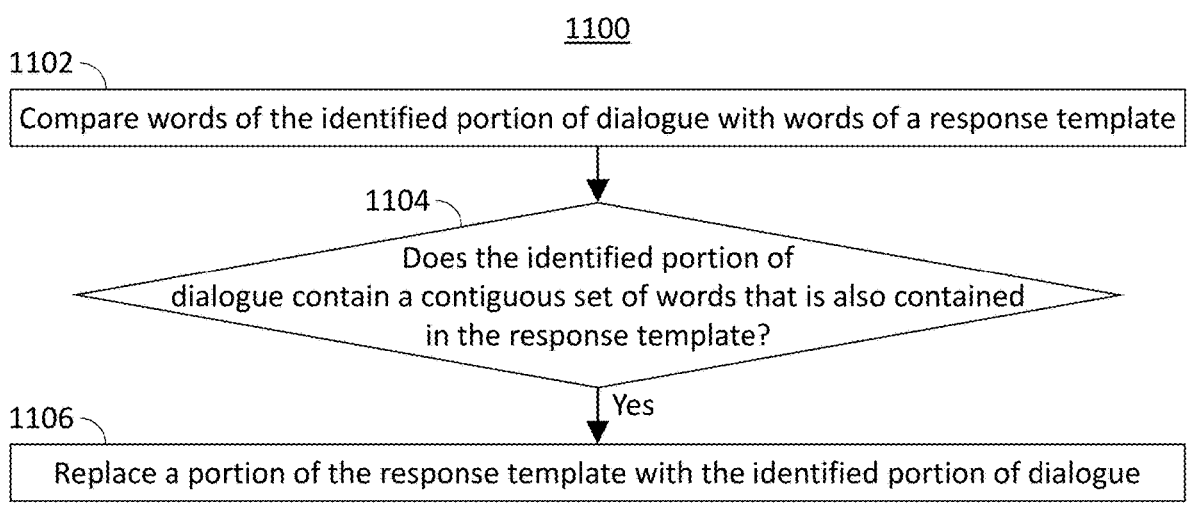
FIG. 11 is a flowchart representing a process for replacing a portion of a response to a query with a portion of dialogue, in accordance with some embodiments of the disclosure.

FIG. 11 is a flowchart representing an illustrative process 1100 for replacing a portion of a response to a query with a portion of dialogue, in accordance with some embodiments of the disclosure. Process 1100 may be implemented on control circuitry 402. In addition, one or more actions of process 1100 may be incorporated into or combined with one or more actions of any other process or embodiment described herein.

At 1102, control circuitry 402, using natural language processing circuitry 404, compares words of the identified portion of dialogue with words of a response template. This may be a simple binary comparison operation, a regular expression comparison operation, or any other suitable text comparison. At 1104, control circuitry 402 determine whether the identified portion of dialogue contains a contiguous set of words that is also contained in the response template. For example, the response template for a query asking for information on where to watch the movie "The Godfather" may include the words "an offer" if control circuitry 402 identifies a limited time offer or sale for purchasing or renting "The Godfather." The identified portion of dialogue may be "I'm gonna make him an offer he can't refuse." Natural language processing circuitry 404 determines that the words "an offer" appear together in the same order in both the response template and the portion of dialogue. In that case, at 1106, natural language processing circuitry 404 replaces a portion of the response template with the identified portion of dialogue, or a portion thereof. For example, the response template reads "There is an offer to purchase {X} for only {PRICE} on {SOURCE}," where {X} represents the content item, {PRICE} represents the purchase price, and {SOURCE} represents the content provider or service from which the content item can be purchased. The response may be modified by natural language processing circuitry 404 to substitute some of the identified portion of dialogue into the response template so that it reads "There is an offer you can't refuse to purchase 'The Godfather' for only $2.99 on Amazon."

The actions or descriptions of FIG. 11 may be used with any other embodiment of this disclosure. In addition, the actions and descriptions described in relation to FIG. 11 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a query;
   determining a response to the query;
   determining whether the query is related to a media content item;
   in response to determining that the query is related to the media content item, identifying a portion of the media content item; and
   inserting the identified portion of the media content item into the response, wherein the identified portion includes at least one of an exclamation based on the media content item, dialogue related to a specific character based on the media content item, or dialogue related to and based on the specific media content item.

2. The method of claim 1, wherein the identifying the portion of the media content item comprises:
identifying a part of speech to be inserted into the response;
determining, using natural language processing, whether the portion of the content item includes the identified part of speech;
in response to determining that the portion of the media content item includes the identified part of speech, selecting the portion of the media content item; and
in response to determining that no portion of the media content item includes the identified part of speech:
select the portion of the media content item; and
modifying the selected portion of the media content item to include the identified part of speech.

3. The method of claim 1, wherein the identifying the portion of the media content item comprises:
retrieving metadata of the portion of the media content item;
comparing the metadata of the portion of the media content item with a type of response to the query; and
selecting, based on the comparing, the portion of the media content item.

4. The method of claim 1, further comprising:
retrieving a response template corresponding to a type of response to the query;
determining, using natural language processing, whether the category of the portion of the media content item can be inserted into the response template; and
in response to determining that the category of the portion of the media content item can be inserted into the response template, selecting the portion of the media content item.

5. The method of claim 1, wherein the query is related to an entity within the media content item, the method further comprising:
identifying the entity, wherein an identified portion of the media content item corresponds to the entity;
retrieving a response template corresponding to a type of response to the query;
determining, using natural language processing, whether the identified portion of the media content item can be grammatically inserted into the response template; and
in response to determining that the identified portion of the media content item cannot be grammatically inserted into the response template, replacing proper nouns and pronouns within the identified portion of the media item with appropriate pronouns.

6. The method of claim 1, further comprising:
comparing words of the identified portion of the media content item with words of a response template corresponding to a type of response to the query;
determining, based on the comparing, whether the identified portion of the media content item contains a contiguous set of words that is also contained in the response template; and
in response to determining that the identified portion of the media content item contains the contiguous set of words that is also contained in the response template, replacing a portion of the response template with the identified portion of the media content item.

7. The method of claim 1, further comprising:
determining, based on the query, a type of response to the query,
wherein the inserting the identified portion of the media content item into the response is based on the type of response to the query.

8. The method of claim 1, further comprising:
generating the response for output, wherein the response includes at least one of an acknowledgment, a generic answer, or one or more search results.

9. The method of claim 1, wherein the response further includes the inserted identified portion, and
wherein the response including the inserted identified portion is more engaging than the response including the response prior to including the inserted identified portion.

10. The method of claim 1, wherein each portion of the media content item comprises at least one of a portion of a book, a play, a show, or a movie; or a famous line of a famous creative work.

11. A system comprising:
memory; and
control circuitry configured to:
receive a query;
determine a response to the query;
determine whether the query is related to a media content item;
in response to determining that the query is related to the media content item, identify a portion of the media content item; and
insert the identified portion of the media content item into the response, wherein the identified portion includes at least one of an exclamation based on the media content item, dialogue related to a specific character based on the media content item, or dialogue related to and based on the specific media content item.

12. The system of claim 11, wherein the control circuitry configured to identify the portion of the media content item is further configured to:
identify a part of speech to be inserted into the response;
determine, using natural language processing, whether the portion of the media content item includes the identified part of speech;
in response to determining that the portion of the media content item includes the identified part of speech, select the portion of the media content item; and
in response to determining that no portion of the media content item includes the identified part of speech:
select the portion of the media content item; and
modify the selected portion of the media content item to include the identified part of speech.

13. The system of claim 11, wherein the control circuitry configured to identify the portion of the media content item is further configured to:
retrieve metadata of the portion of the media content item;
compare the metadata of the portion of the media content item with a type of response to the query; and
select, based on the comparing, the portion of the media content item.

14. The system of claim 11, wherein the control circuitry is further configured to:
retrieve a response template corresponding to a type of response to the query;
determine, using natural language processing, whether the category of the portion of the media content item can be inserted into the response template; and in response to determining that the category of the portion of the media content item can be inserted into the response template, select the portion of the media content item.

15. The system of claim 11, wherein the query is related to an entity within the media content item, and wherein the control circuitry is further configured to:
   identify the entity, wherein an identified portion of the media content item corresponds to the entity;
   retrieve a response template corresponding to a type of response to the query;
   determine, using natural language processing, whether the identified portion of the media content item can be grammatically inserted into the response template; and
   in response to determining that the identified portion of the media content item cannot be grammatically inserted into the response template, replace proper nouns within the identified portion of the media content item with appropriate pronouns.

16. The system of claim 11, wherein the control circuitry is further configured to:
   compare words of the identified portion of the media content item with words of a response template corresponding to a type of response to the query;
   determine, based on the comparing, whether the identified portion of the media content item contains a contiguous set of words that is also contained in the response template; and
   in response to determining that the identified portion of the media content item contains the contiguous set of words that is also contained in the response template, replace a portion of the response template with the identified portion of the media content item.

17. The system of claim 11, wherein the control circuitry is further configured to:
   determine, based on the query, a type of response to the query,
   wherein the inserting the identified portion of the media content item into the response is based on the type of response to the query.

18. The system of claim 11, wherein the control circuitry is further configured to:
   generate the response for output, wherein the response includes at least one of an acknowledgment, a generic answer, or one or more search results.

19. The system of claim 11, wherein the response further includes the inserted identified portion, and
   wherein the response including the inserted identified portion is more engaging than the response including the response prior to including the inserted identified portion.

20. The system of claim 11, wherein each portion of the media content item comprises at least one of a portion of a book, a play, a show, or a movie; or a famous line of a famous creative work.

\* \* \* \* \*